United States Patent Office 3,296,310
Patented Jan. 3, 1967

3,296,310
PROCESS FOR THE PREPARATION OF THIOBISPHENOLS
Herman S. Gilbert, Angleton, Tex., assignor to The Dow Chemical Company, Midland, Mich., a corporation of Delaware
No Drawing. Filed Mar. 26, 1964, Ser. No. 355,066
5 Claims. (Cl. 260—609)

This invention relates to a process for producing thiobisphenols. More particularly, it concerns a process for reacting elemental sulfur with a phenol in the presence of a halogen as a catalyst.

Thiobisphenols, used in the preparation of liquid epoxy resins, generally are produced by the reaction of a phenol with a sulfur halide such as $S_2Cl_2$ or $SCl_2$. The handling of the sulfur halides is objectionable owing to their highly corrosive properties.

According to my invention, the thiobisphenols can be produced in good yield without the use of the sulfur halide. I have found that thiobisphenols can be obtained by the reaction of phenols with elementary sulfur in the presence of a halogen such as iodine or bromine which acts as a catalyst.

The process may be illustrated by referring to the following example describing the preparation of a quantity of thiobisphenol according to my invention.

Example 1

One atomic equivalent of sulfur was mixed with two molecular equivalents of phenol in the presence of 0.003 mole of iodine and maintained at a temperature of 176° C. for 8 hours. At the end of that time unreacted phenol was removed by vacuum distillation.

The product thiobisphenol was then reacted with epichlorohydrin at 100–110° C. by the continuous addition of 50 percent caustic and azeotropic removal of water. The by-product sodium chloride was then removed by filtration and the excess epichlorohydrin stripped off under vacuum. After diluting the product with toluene and washing several times with water, the toluene was stripped off under vacuum. The resulting epoxy resin which was produced in 88 percent yield contained 22.32–22.53 percent epoxide and 10.04–10.46 percent sulfur. The theoretical sulfur content of the diglycidyl ether of thiobisphenol is 9.7 percent; therefore, these data indicate there was a small yield of the bisphenol disulfide along with the thiobisphenol.

Spectroscopic data indicate the phenol is attached to the sulfur atoms at both the ortho and para positions and in approximately equal amounts at each position.

Various substituted phenols such as parachlorophenol, tert.-butylphenol, p-cresol and the like also may be reacted with sulfur to produce bisphenols. Halogenated bisphenols useful in producing flame retardant epoxy resins may be prepared by reacting halogenated phenols such as dibromophenol with sulfur. Resins having greater flexibility may be obtained from alkyl substituted phenols such as nonyl phenol and dinonyl phenol.

In producing thiobisphenols, a stoichiometric quantity of sulfur and phenol may be used; however, it generally is preferred to use an excess of the phenol. With a stoichiometric mixture 48 percent of the sulfur was converted in four hours and 96 percent in 12 hours whereas a mixture containing 100 percent excess phenol converted 96 percent of the sulfur in four hours. Although the reaction mixtures may contain as much as 300 percent excess phenol, it generally is preferred to use about 50 percent excess phenol, i.e. three moles of phenol per atomic equivalent of sulfur.

The temperature at which this reaction is conducted is not critical so long as it is below the level where product decomposition occurs. Temperatures in the range between 100 and 150° C. provide about 90 percent conversion in eight hours or less without any danger of product decomposition.

The halogens which are effective as catalysts in this reaction are iodine and bromine. The amount of catalytic halogen which is added to the reaction mixture may be from about 0.001 to about 0.10 mole per mole of sulfur.

In addition to these elemental halogens, it has also been found that a halogenated phenol such as o-iodophenol is an effective catalyst. The precise catalytic agent is uncertain in view of the possibility that both elemental halogen and halogenated phenol are present owing to equilibration when either elemental halogen or halogenated phenol is mixed with phenol.

I claim:

1. A process for the preparation of thiobisphenols having the sulphur atoms attached to the phenol nucleus substantially exclusively in the ortho- and para-positions comprising reacting a phenolic compound selected from the group consisting of phenol, alkyl-substituted phenols, chlorophenols and bromophenols with elemental sulfur in the presence of a catalytic amount of a halogen selected from the group consisting of iodine and bromine.

2. A process according to claim 1 wherein said phenolic compound is phenol.

3. A process according to claim 1 wherein said halogen is iodine.

4. A process for the preparation of thiobisphenols having the sulphur atoms attached to the phenol nucleus substantially exclusively in the ortho- and para-positions comprising mixing elemental sulfur with a phenolic compound selected from the group consisting of phenol, alkyl-substituted phenols, chlorophenols and bromophenols in a ratio of about 3 moles of said phenolic compound per atomic equivalent of said sulfur, together with about 0.001 to 0.1 mole of a halogen selected from the group consisting of iodine and bromine per atomic equivalent of sulfur and maintaining the temperature of said mixture between about 100 and 150° C. for a period of time up to eight hours.

5. A process according to claim 4 wherein said halogen is iodine.

No references cited.

CHARLES B. PARKER, *Primary Examiner.*

D. R. PHILLIPS, *Assistant Examiner.*